(12) United States Patent
Wilkie

(10) Patent No.: US 10,053,382 B2
(45) Date of Patent: Aug. 21, 2018

(54) OVER GRATE FILTER APPARATUS AND METHOD

(71) Applicant: Granite Environmental, Inc., Sebastian, FL (US)

(72) Inventor: Mark Wilkie, Sebastian, FL (US)

(73) Assignee: Granite Enviromental, Inc., Sebastian, FL (US)

( * ) Notice: Subject to any disclaimer, the term of this patent is extended or adjusted under 35 U.S.C. 154(b) by 182 days.

(21) Appl. No.: 15/251,331

(22) Filed: Aug. 30, 2016

(65) Prior Publication Data

US 2017/0058504 A1    Mar. 2, 2017

Related U.S. Application Data

(60) Provisional application No. 62/212,579, filed on Aug. 31, 2015.

(51) Int. Cl.

| | |
|---|---|
| *B01D 39/10* | (2006.01) |
| *E02B 15/00* | (2006.01) |
| *C02F 1/00* | (2006.01) |
| *B01D 27/02* | (2006.01) |
| *E03F 5/06* | (2006.01) |

(Continued)

(52) U.S. Cl.
CPC ............ *C02F 1/5281* (2013.01); *C02F 1/001* (2013.01); *C02F 1/004* (2013.01); *C02F 1/283* (2013.01); *C02F 1/286* (2013.01); *E03F 5/041* (2013.01); *E03F 5/0404* (2013.01); *C02F 2101/20* (2013.01); *C02F 2101/32* (2013.01); *C02F 2103/001* (2013.01); *C02F 2209/40* (2013.01); *Y02A 20/156* (2018.01)

(58) Field of Classification Search
CPC ......... E03F 5/0404; E03F 1/00; E03F 5/0401; E03F 5/14; B01D 29/27; B01D 17/0202; B01D 61/08; B01D 61/10; B01D 2311/2649; B01D 61/20; B01D 2201/0415; C02F 2103/001; C02F 1/28; C02F 1/001; C02F 1/285; C02F 9/005; C02F 2201/006; E02D 29/14; E02D 29/1427

See application file for complete search history.

(56) References Cited

U.S. PATENT DOCUMENTS

| | | | |
|---|---|---|---|
| 5,133,619 A * | 7/1992 | Murfae | B01D 24/12 404/4 |
| 5,223,154 A * | 6/1993 | MacPherson, Jr. | B01D 24/002 210/790 |

(Continued)

*Primary Examiner* — Ana Fortuna

(57) ABSTRACT

An over grate filter for covering a grate and filtering storm water runoff is claimed and described. The over grate filter of the invention helps to control the flow of waterborne sediment and pollutants into the storm water grate, and it also serves to reduce the amount of sediment entering drainage systems. The invention may be fabricated from any filtration fabrics, including woven and non-woven fabrics. The selection of the specific filter fabric used in the invention depends on the anticipated storm water flow velocities, the anticipated pollutant volume and the expected maintenance schedule. The over grate filter of the invention may comprise multiple layers of filter material and a supporting inner core that enables the filter to lie flat on the storm water grate, providing improved wear resistance against foot and vehicle traffic and street sweeping activity over the prior art methods for filtering storm water.

15 Claims, 17 Drawing Sheets

(51) Int. Cl.

| | |
|---|---|
| *E03F 5/14* | (2006.01) |
| *E03F 9/00* | (2006.01) |
| *C02F 1/52* | (2006.01) |
| *C02F 1/28* | (2006.01) |
| *E03F 5/04* | (2006.01) |
| *C02F 101/20* | (2006.01) |
| *C02F 101/32* | (2006.01) |
| *C02F 103/00* | (2006.01) |

(56) References Cited

U.S. PATENT DOCUMENTS

| | | | | |
|---|---|---|---|---|
| 5,849,198 | A * | 12/1998 | Sharpless | C02F 1/285 210/693 |
| 6,045,691 | A * | 4/2000 | McDermott | B01D 17/00 210/164 |
| 6,808,623 | B2 * | 10/2004 | Harris | E03F 5/0404 210/164 |
| 7,156,987 | B1 * | 1/2007 | Sanguinetti | E03F 1/00 210/164 |
| 8,043,498 | B2 * | 10/2011 | Rueda | E03F 1/00 210/164 |
| 9,315,961 | B2 * | 4/2016 | Lancaster | E02D 31/00 |
| 2011/0247973 | A1 * | 10/2011 | Sargand | C02F 1/288 210/232 |
| 2017/0057832 | A1 * | 3/2017 | Wilkie | C02F 1/004 |
| 2017/0058504 | A1 * | 3/2017 | Wilkie | C02F 1/004 |

\* cited by examiner

Beltech 4 x 6

Product Data Sheet
July 2013

A woven geotextile fabric, produced from polypropylene slit-film tapes, which will meet or exceed the following MARV's. This fabric is produced for use in Filtration and Dewatering application. Its sand color makes it more appealing than traditional black fabrics in many applications.

| Property | Test Method | English Units | | | SI Units | | |
|---|---|---|---|---|---|---|---|
| | | MARV | | | MARV | | |
| | | MD | CD | | MD | CD | |
| Grab Tensile Strength - Typical | ASTM D-4632 | 600 | 700 | lbs | 2670 | 3115 | N |
| Grab Tensile Elongation - Typical | ASTM D-4632 | 20 | 15 | % | 20 | 15 | % |
| Wide Width Tensile Ultimate | ASTM D-4595 | 400 | 600 | lbs/in | 70 | 105 | kN/m |
| Wide Width Elongation | ASTM D-4595 | 17 | 13 | % | 17 | 13 | % |
| Wide Width @ 2% - Typical | ASTM D-4595 | 25 * | 130 * | lbs/in | 4.4 * | 22.6 * | kN/m |
| Wide Width @ 5% - Typical | ASTM D-4595 | 90 * | 300 * | lbs/in | 15.8 * | 52.5 * | kN/m |
| Trapezoid Tear | ASTM D-4533 | 280 | 300 | lbs | 1246 | 1335 | N |
| "CBR" Puncture - Typical | ASTM D-6241 | 2950 * | | lbs | 13.1 * | | kN |
| Puncture | ASTM D-4833 | 250 | | lbs | 1113 | | N |
| Permittivity | ASTM D-4491 | 0.260 | | sec$^{-1}$ | 0.260 | | sec$^{-1}$ |
| A.O.S. | ASTM D-4751 | 40 | | U.S. Sieve | 0.425 | | mm |
| UV Resistance (1200 hrs) - Typical | ASTM D-4355 | 85 | | % | 85 | | % |
| UV Resistance (1200 hrs) - MARV | ASTM D-4355 | 70 | | % | 70 | | % |
| Water Flow Rate | ASTM D-4491 | 20 | | gpm/ft$^2$ | 815 | | l/min/m$^2$ |
| Pore Size Distribution (O$_{50}$) ** | ASTM D-6767 | ~ 175 * | | U.S. Sieve | 85 * | | micron |
| Pore Size Distribution (O$_{95}$) ** | ASTM D-6767 | ~ 50 * | | U.S. Sieve | 307 * | | micron |

* Typical value rather than MARV

** Performed by TRI Environmental, Austin Texas

FIGURE 21

P.O. Box 640
1800 Springhead Ch. Rd.
Willacoochee, Ga. 31650

912-534-6071
800-948-7870
912-534-6254(fax)

Subject: LM 2199

LM 2119 is manufactured using high tenacity polypropylene yarns that are woven to form a dimensionally stable network, which allows the yarns to maintain their relative position. LM 2119 resists ultraviolet deterioration, rotting and biological degradation and is inert to commonly encountered soil chemicals. LM 2199 will satisfy the requirements as outlined in AASHTO M-288-06 for Permanent Erosion Control & Subsurface Drainage Class 3.

| PROPERTY | TEST METHOD | MARV ENGLISH | MARV METRIC |
|---|---|---|---|
| Tensile Strength (Grab) | ASTM D-4632 | 370 x 250 lbs | 1647 x 1113 N |
| Elongation | ASTM D-4632 | 15% | 15% |
| Puncture | ASTM D-4833 | 120 lbs | 534 N |
| Mullen Burst | ASTM D-3786 | 450 psi | 3100 kPa |
| Trapezoidal Tear | ASTM D-4533 | 100 x 60 lbs | 445 x 267 N |
| UV Resistance (at 500 hrs) | ASTM D-4355 | 90% | 90% |
| Apparent Opening Size (AOS) | ASTM D-4751 | 70 US Std. Sieve | 0.212 mm |
| Percent Open Area (POA) | COE-02215 | 4% | 4% |
| Permittivity | ASTM D-4491 | 0.28 sec⁻¹ | 0.28 sec⁻¹ |
| Water Flow Rate | ASTM D-4491 | 18 gpm/ft² | 733 l/min/m² |
| Roll Sizes | | 6' x 300' | 1.83 m x 91.5 m |
| | | 12' x 300' | 3.65 m x 91.5 m |

Unless otherwise noted, this certification is based on testing conducted by our Quality Assurance & Quality Control testing laboratories at the time of manufacturing. L & M Supply Co., Inc. issued this letter of certification to indicate our commitment to providing our customers with a quality product which will meet or exceed the minimum average roll values in accordance with the applicable American Society for Testing and Materials (ASTM) test method.

FIGURE 22

LM 2404

LM 2404 is manufactured using high tenacity polypropylene yarns that are woven to form a dimensionally stable network, which allows the yarns to maintain their relative position.
LM 2404 resists ultraviolet deterioration, rotting, and biological degradation and is inert to commonly encountered soil chemicals.

| PROPERTY | TEST METHOD | MARV English | MARV Metric |
|---|---|---|---|
| Tensile Strength (Grab) | ASTM D-4632 | 400 x 315 lbs | 1780 x 1402 N |
| Elongation | ASTM D-4632 | 15% | 15% |
| CBR Puncture | ASTM D-6241 | 1150 lbs | 5118 N |
| Trapezoidal Tear | ASTM D-4533 | 150 x 165 lbs | 668 x 734 N |
| Wide Width Tensile | ASTM D-4595 | 3000 x 2760 lbs | 13.34 x 12.28 kN |
| UV Resistance (at 500 hrs) | ASTM D-4355 | 90% | 90% |
| Apparent Opening Size (AOS) | ASTM D-4751 | 40 US Std. Sieve | 0.425 mm |
| Percent Open Area (POA) | COE-02215 | 1% | 1% |
| Permittivity | ASTM D-4491 | 0.90 sec⁻¹ | 0.90 sec⁻¹ |
| Permeability | ASTM D4491 | .07 cm/sec | .07 cm/sec |
| Water Flow Rate | ASTM D-4491 | 70 gpm/ft² | 2852 l/min/m² |

*Minimum Average Roll Value

Notes:
* Mullen Burst ASTM D-3786 has been removed. It is not recognized by ASTM D-35 on Geosynthetics.
* Puncture ASTM D-4833 has been removed. It is not recognized by AASHTO M288 and has been replaced with CBR Puncture ASTM D-6241.

| PROPERTY | Typical English | Typical Metric |
|---|---|---|
| Roll Dimensions | 15 x 300 ft | 4.6 x 91.5 m |
| Roll Area | 500 yd² | 418 m² |

FIGURE 23

Mirafi® 160N

Data for Comparison

Mirafi® 160N is a needlepunched nonwoven geotextile composed of polypropylene fibers, which are formed into a stable network such that the fibers retain their relative position. Mirafi® 160N is inert to biological degradation and resists naturally encountered chemicals, alkalis, and acids. Mirafi® 160N meets Aashto M288-06 Class 2 for elongation > 50%. TenCate Geosynthetics Americas is accredited by a2La (The American Association for Laboratory Accreditation) and Geosynthetic Accreditation Institute - Laboratory Accreditation Program (GAI-LAP). This data sheet for Mirafi® 160N is provided for comparison purposes only.

| PROPERTY | TEST METHOD | ENGLISH | METRIC |
|---|---|---|---|
| Weight - Typical | ASTM D-5261 | 6.0 oz/sy | 203 g/sm |
| Tensile Strength | ASTM D-4632 | 160 lbs | 712 N |
| Elongation @ Break | ASTM D-4632 | 50% | 50% |
| CBR Puncture | ASTM D-6241 | 410 lbs | 1,825 N |
| Trapezoidal Tear | ASTM D-4533 | 60 lbs | 300 N |
| Apparent Opening Size | ASTM D-4751 | 70 US Sieve | .212 mm |
| Permittivity | ASTM D-4491 | 1.50 Sec-1 | 1.50 Sec-1 |
| Water Flow Rate | ASTM D-4491 | 110 g/min/sf | 4,481 l/min/sm |
| UV Resistance @ 500 Hours | ASTM D-4355 | 70% | 70% |

FIGURE 24

Mirafi® FW 300

Data for Comparison

Mirafi® FW 300 geotextile is composed of polypropylene yarns, which are woven into a stable network such that the yarns retain their relative position. Mirafi® FW 300 geotextile is inert to biological degradation and resists naturally encountered chemicals, alkalis, and acids. TenCate Geosynthetics Americas is accredited by a2La (The American Association for Laboratory Accreditation) and Geosynthetic Accreditation Institute – Laboratory Accreditation Program (GAI-LAP). This data sheet for Mirafi® FW 300 is provided for comparison purposes only.

| PROPERTY | TEST METHOD | ENGLISH | METRIC |
|---|---|---|---|
| Weight – Typical | ASTM D-5261 | 8.4 oz/sy | 285 g/sm |
| Tensile Strength | ASTM D-4632 | 400 x 335 lbs | 1,780 x 1,491 N |
| Elongation @ Break | ASTM D-4632 | 20 x 15% | 20 x 15% |
| Thickness – Typical | ASTM D-5199 | 35 mils | 0.90 mm |
| Wide Width Tensile | ASTM D-4595 | 2,760 x 2,700 lbs/ft | 40.3 x 39.4 kN/m |
| CBR Puncture | ASTM D-6241 | 1,250 lbs | 5,563 N |
| Trapezoidal Tear | ASTM D-4533 | 145 x 125 lbs | 645 x 556 N |
| Apparent Opening Size | ASTM D-4751 | 30 US Sieve | .600 mm |
| Permittivity | ASTM D-4491 | 1.50 Sec-1 | 1.50 Sec-1 |
| Permeability | ASTM D-4491 | 0.13 cm/sec | 0.13 cm/sec |
| Water Flow Rate | ASTM D-4491 | 115 g/min/sf | 4,685 l/min/sm |
| Percent Open Area | CW-02215 | 8% | 8% |
| UV Resistance @ 500 Hours | ASTM D-4355 | 90% | 90% |

FIGURE 25

Mirafi® FW 403

Data For Comparison

Mirafi® FW 403 geotextile is composed of high-tenacity monofilament polypropylene yarns, which are woven into a stable network such that the yarns retain their relative position. Mirafi® FW 403 geotextile is inert to biological degradation and resists naturally encountered chemicals, alkalis, and acids. TenCate Geosynthetics Americas is accredited by a2La (The American Association for Laboratory Accreditation) and Geosynthetic Accreditation Institute – Laboratory Accreditation Program (GAI-LAP). This data sheet for Mirafi® FW 403 is provided for comparison purposes only

| PROPERTY | TEST METHOD | ENGLISH | METRIC |
|---|---|---|---|
| Weight – Typical | ASTM D-5261 | 8.8 oz/sy | 298 g/sm |
| Thickness – Typical | ASTM D-5199 | 20 mils | 0.50 mm |
| Tensile Strength | ASTM D-4632 | 425 x 350 lbs | 1,891 x 1,558 N |
| Elongation @ Break | ASTM D-4632 | 21 x 21% | 21 x 21% |
| Wide Width Tensile | ASTM D-4595 | 3,240 x 2,700 lbs/ft (270 x 225 lbs/in) | 47.3 x 39.4 kN/m |
| CBR Puncture | ASTM D-6241 | 1,340 lbs | 5,963 N |
| Trapezoidal Tear | ASTM D-4533 | 145 x 125 lbs | 645 x 556 N |
| Apparent Opening Size | ASTM D-4751 | 40 US Sieve | .43 mm |
| Permittivity | ASTM D-4491 | 0.96 Sec-1 | 0.96 Sec-1 |
| Permeability | ASTM D-4491 | .046 cm/sec | .046 cm/sec |
| Water Flow Rate | ASTM D-4491 | 70 g/min/sf | 2,852 l/min/sm |
| Percent Open Area | CW-02215 | 6% | 6% |
| UV Resistance @ 500 Hours | ASTM D-4355 | 90% | 90% |

FIGURE 26

Mirafi® 140NL

Data for Comparison

Mirafi® 140NL is a needlepunched nonwoven geotextile composed of polypropylene fibers, which are formed into a stable network such that the fibers retain their relative position. Mirafi® 140NL is inert to biological degradation and resists naturally encountered chemicals, alkalis, and acids. TenCate Geosynthetics Americas is accredited by a2La (The American Association for Laboratory Accreditation) and Geosynthetic Accreditation Institute – Laboratory Accreditation Program (GAI-LAP). This data sheet for Mirafi® 140NL is provided for comparison purposes only.

| PROPERTY | TEST METHOD | ENGLISH | METRIC |
|---|---|---|---|
| Weight – Typical | ASTM D-5261 | 3.5 oz/sy | 119 g/sm |
| Tensile Strength | ASTM D-4632 | 90 lbs | 401 N |
| Elongation @ Break | ASTM D-4632 | 50% | 50% |
| CBR Puncture | ASTM D-6241 | 250 lbs | 1,113 N |
| Trapezoidal Tear | ASTM D-4533 | 40 lbs | 178 N |
| Apparent Opening Size | ASTM D-4751 | 50 US Sieve | .30 mm |
| Permittivity | ASTM D-4491 | 2.00 Sec-1 | 2.00 Sec-1 |
| Water Flow Rate | ASTM D-4491 | 145 g/min/sf | 5,907 l/min/sm |
| UV Resistance @ 500 Hours | ASTM D-4355 | 70% | 70% |

FIGURE 27

TENCATE GEOSYNTHETICS
Americas

Mirafi® 180N is a needlepunched nonwoven geotextile composed of polypropylene fibers, which are formed into a stable network such that the fibers retain their relative position. Mirafi® 180N is inert to biological degradation and resists naturally encountered chemicals, alkalis, and acids. Mirafi® 180N meets AASHTO M288-06 Class 1 for Elongation > 50%.

TenCate Geosynthetics Americas Laboratories are accredited by a2la (The American Association for Laboratory Accreditation) and Geosynthetic Accreditation Institute – Laboratory Accreditation Program (GAI-LAP). NTPEP Listed

| Mechanical Properties | Test Method | Unit | Minimum Average Roll Value | |
|---|---|---|---|---|
| | | | MD | CD |
| Grab Tensile Strength | ASTM D4632 | lbs (N) | 205 (912) | 205 (912) |
| Grab Tensile Elongation | ASTM D4632 | % | 50 | 50 |
| Trapezoid Tear Strength | ASTM D4533 | lbs (N) | 80 (356) | 80 (356) |
| CBR Puncture Strength | ASTM D6241 | lbs (N) | 500 (2224) | |
| | | | Maximum Opening Size | |
| Apparent Opening Size (AOS) | ASTM D4751 | U.S. Sieve (mm) | 80 (0.18) | |
| | | | Minimum Roll Value | |
| Permittivity | ASTM D4491 | sec$^{-1}$ | 1.4 | |
| Flow Rate | ASTM D4491 | gal/min/ft$^2$ (l/min/m$^2$) | 95 (3870) | |
| | | | Minimum Test Value | |
| UV Resistance (at 500 hours) | ASTM D4355 | % strength retained | 70 | |

| Physical Properties | Unit | Roll Sizes | |
|---|---|---|---|
| Roll Dimensions (width x length) | ft (m) | 12.5 x 360 (3.8 x 110) | 15 x 300 (4.57 x 91.4) |
| Roll Area | yd$^2$ (m$^2$) | 500 (418) | |

FIGURE 28

Mirafi® FW500

Mirafi® FW500 geotextile is composed of high-tenacity monofilament and slit tape polypropylene yarns, which are woven into a stable network such that the yarns retain their relative position. Mirafi® FW500 geotextile is inert to biological degradation and resists naturally encountered chemicals, alkalis, and acids.

| Mechanical Properties | Test Method | Unit | Minimum Average Roll Value | |
|---|---|---|---|---|
| | | | MD | CD |
| Wide Width Tensile Strength | ASTM D4595 | kN/m (lbs/in) | 32.1 (183) | 43.8 (250) |
| Grab Tensile Strength | ASTM D4632 | N (lbs) | 1446 (325) | 1891 (425) |
| Grab Tensile Elongation | ASTM D4632 | % | 15 | 15 |
| Trapezoid Tear Strength | ASTM D4533 | N (lbs) | 601 (135) | 668 (150) |
| CBR Puncture Strength | ASTM D6241 | N (lbs) | 4450 (1000) | |
| Apparent Opening Size (AOS)[1] | ASTM D4751 | mm (U.S. Sieve) | 0.30 (50) | |
| Percent Open Area | COE-02215 | % | 4 | |
| Permittivity | ASTM D4491 | sec$^{-1}$ | 0.51 | |
| Permeability | ASTM D4491 | cm/sec | 0.027 | |
| Flow Rate | ASTM D4491 | l/min/m$^2$ (gal/min/ft$^2$) | 1426 (35) | |
| UV Resistance (at 500 hours) | ASTM D4355 | % strength retained | 70 | |

[1] ASTM D 4751: AOS is a Maximum Opening Diameter Value

| Physical Properties | Test Method | Unit | Typical Value |
|---|---|---|---|
| Mass/Unit Area | ASTM D5261 | g/m$^2$ (oz/yd$^2$) | 271 (8.0) |
| Thickness | ASTM D5199 | mm (mils) | 0.9 (35) |
| Roll Dimensions (width x length) | -- | m (ft) | 3.7 (12) x 91 (300) |
| Roll Area | -- | m$^2$ (yd$^2$) | 334 (400) |
| Estimated Roll Weight | -- | kg (lbs) | 96 (212) |

FIGURE 29

OVER GRATE FILTER APPARATUS AND METHOD

CROSS REFERENCE TO RELATED APPLICATIONS AND INCORPORATION BY REFERENCE

This non provisional patent application claims benefit of priority to U.S. provisional patent application Ser. No. 62/212,579, titled OVER GRATE FILTER APPARATUS AND METHOD, filed in the United States Patent and Trademark Office on Aug. 31, 2015, which is hereby incorporated in its entirety by reference.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The field of the invention relates generally to filters for storm water systems, specifically filter adaptable to fit over or work in conjunction with storm water inlet grates and the like. Such filters generally operate to keep sediment, debris and other unwanted material from entering a storm water drainage system.

2. Background Art

Storm water draining from construction sites or major roadways often contains suspended sediments. This may be especially true when rain encounters open soil sheet and runoff occurs. Runoff water can also carry with it debris and a variety of other pollutants such as, for example, metals, hydrocarbons, oils, trash, organic debris and the like. When water containing this unwanted material enters a storm water grate without filtering, it transfers all these pollutants into area waterways where they can disturb ecosystems and negatively affect water quality. This can result in major fines and non-compliance with federal regulations, such as the National Pollutant Discharge Elimination System (NPDES) and the Clean Water act.

Traditional storm water filtering systems require removal of the grate itself to install a filter, sometimes underneath the grate as a catch basin, and sometimes as an envelope that encompasses the entire grate. Removing a grate from a storm water entry requires significantly more labor, more equipment, less safety, less convenience and less ease of use as compared to installing an over grate filter of the invention.

In addition, the traditional storm water filtering systems are not designed to introduce treatments into the runoff. Their fasteners are often obtrusive, sometimes made of metal that when broken can damage vehicle tires and street sweeping equipment. Broken metal fasteners have the potential to become road hazards, damaging automobile tires and posing a slipping danger for pedestrians.

What is needed in the art, therefore, is an effective storm water filtering system that does not require removal of the storm water grate, is easy to install and to remove, allows for providing treatment of water for removal of metals, hydrocarbons and the like and is safe for vehicle tires and pedestrian traffic.

BRIEF SUMMARY OF THE INVENTION

The present over grate filter of the invention comprises an apparatus and method that have one or more of the following features and/or steps, which alone or in any combination may comprise patentable subject matter.

The present invention overcomes the shortcomings of the prior art in that it provides an over-grate solution for filtering storm water that does not require removal of the storm water grate, is easy to install and to remove, and is safe for vehicle tires and pedestrian traffic.

In accordance with one embodiment of the present invention, the invention comprises a low-profile filter designed to remove contaminants in storm water or other runoff before they enter a storm water grate. The invention comprises fabric that may be either a woven or non-woven filtration media made from monofilament, slit film, or fiber yarns. It is customizable in size and shape, allowing for such auxiliary mechanisms as extra-absorbent layers to be included. These special layers can serve as a point for the introduction of flocculants, coagulants, extra activated charcoal filters, heavy metal filters and hydrocarbon filters. The over grate filter of the invention may be fabricated in a variety of colors for enhanced visibility as an optional safety feature.

The invention comprises fasteners that hold the over grate filter firmly to the grate, and these fasteners differ from conventional fasteners in that they are made of soft plastic, nylon, rubber, foam and other materials that are safe for vehicle tire and foot traffic. They are unobtrusive and can be installed securely from above the grate with no special tooling. The fasteners of the invention are designed to receive plastic locking mechanisms to hold the top and bottom pieces together. The filter units extend past the edge of the receiving grate to ensure no bypass of material between the grate and supporting grate structure.

The present method and device of the invention further overcome the shortcomings of the prior art by performing well when vehicles drive over it. The stabilizing mesh incorporated into the design helps it maintain its shape and integrity and reduces the chances of distortion. This also maintains the filter profile and minimizes fabric stretching, preventing the filter from becoming a trip hazard or getting caught on maintenance equipment.

In an embodiment, the over grate filter of the invention is a fabric filter designed to cover a grate that receives water runoff. The over grate filter of the invention helps to control the flow of waterborne sediment and pollutants into the storm water grate, and it also serves to reduce the amount of sediment entering drainage systems. The invention may be fabricated from any filtration fabrics, including woven and non-woven fabrics. The selection of the specific filter fabric used in the invention depends on the anticipated storm water flow velocities, the anticipated pollutant volume and the expected maintenance schedule. The over grate filter of the invention may comprise multiple layers of filter material and a support inner core that enables the filter to lie flat on the storm water grate, providing improved wear resistance against foot and vehicle traffic and street sweeping activity over the prior art methods for filtering storm water. Previously available filters tend to tear and to wear quickly due to the action of the stiff polypropylene sweeper bristles that are used in sweeping operations.

The over grate filter of the invention filters out particulate matter which may be silts, sand, and mid-sized debris such as grass clippings, leaves or trash. The over grate filter of the invention comprises a sediment ridge perimeter extending above a hard surface (i.e., asphalt, concrete roadway) that helps reduce water velocity in order to encourage settling of solids suspended in the water. Solids that are easily conveyed by water flow are then filtered by the layers of filter fabric and metallic mesh.

The over grate filter of the invention may optionally contain activated carbon, chitosan, flocculants, coagulants, polymers, adsorbents and absorbent media to help reduce pollutants entering the drainage system. Low-profile fasteners and retaining plates secure the filter with a lower retaining plate that drops through the grate from the top (without the need for lifting the grate), and an upper retaining plate on top, attached by plastic locking mechanisms to keep the filter of the invention in place. These easy-to-install fasteners reduce time and labor to install over the systems of the prior art while providing stable, inexpensive and effective holding of the over grate filter of the invention.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the drawings:

FIG. 21 depicts a data sheet showing material characteristics of Beltech 4×6 permeable filter fabric material.

FIG. 22 depicts a data sheet showing material characteristics of LM 2199 permeable filter fabric material.

FIG. 23 depicts a data sheet showing material characteristics of LM 2404 permeable filter fabric material.

FIG. 24 depicts a data sheet showing material characteristics of 160N permeable filter fabric material.

FIG. 25 depicts a data sheet showing material characteristics of FW 300 permeable filter fabric material.

FIG. 26 depicts a data sheet showing material characteristics of FW 403 permeable filter fabric material.

FIG. 27 depicts a data sheet showing material characteristics of 140 NL permeable filter fabric material.

FIG. 28 depicts a data sheet showing material characteristics of 180 N permeable filter fabric material.

FIG. 29 depicts a data sheet showing material characteristics of FW500 permeable filter fabric material.

DETAILED DESCRIPTION OF THE INVENTION

The following documentation provides a detailed description of the invention.

As referred to herein, "permeable filter fabric" means any water permeable fabric, such as, for example, a non-woven geotextile. As referred to herein, a non-woven geotextile allows water flow there through, including planar water flow. They are commonly known as filter fabrics, although woven monofilament geotextiles can also be referred to as filter fabrics. Typical applications for non-woven geotextiles include aggregate drains, asphalt pavement overlays and erosion control. As an example, such water permeable fabrics may be comprised of 4, 8, 10, or 12 oz. per square yard non-woven geotextile material, Belton 4×6 geotextile, 140NLO geotextile, 160NO geotextile, 180NO geotextile, Filter Mat OC geotextile, FW404 geotextile, FW500 geotextile, FW300 geotextile, FW403 geotextile, LM 2199 geotextile or LM 2404 geotextile polypropylene yarn fabrics, in any combination. Data sheets for these exemplary materials are attached as FIGS. 21-28. While these materials are set forth herein as comprising the permeable filter fabric of the invention, it is within the scope of the claimed invention that any fabric may comprise the invention, and any permeable filter fabric may comprise the invention. Thus the scope of the invention is not limited to only those fabrics specifically set forth in FIGS. 21-29. Also, the over grate filter of the invention may comprise any one or more different permeable filter fabric materials in any combination; it is therefore not necessary that the entire over grate filter be comprised of a single type of permeable filter fabric material.

Figure 1:
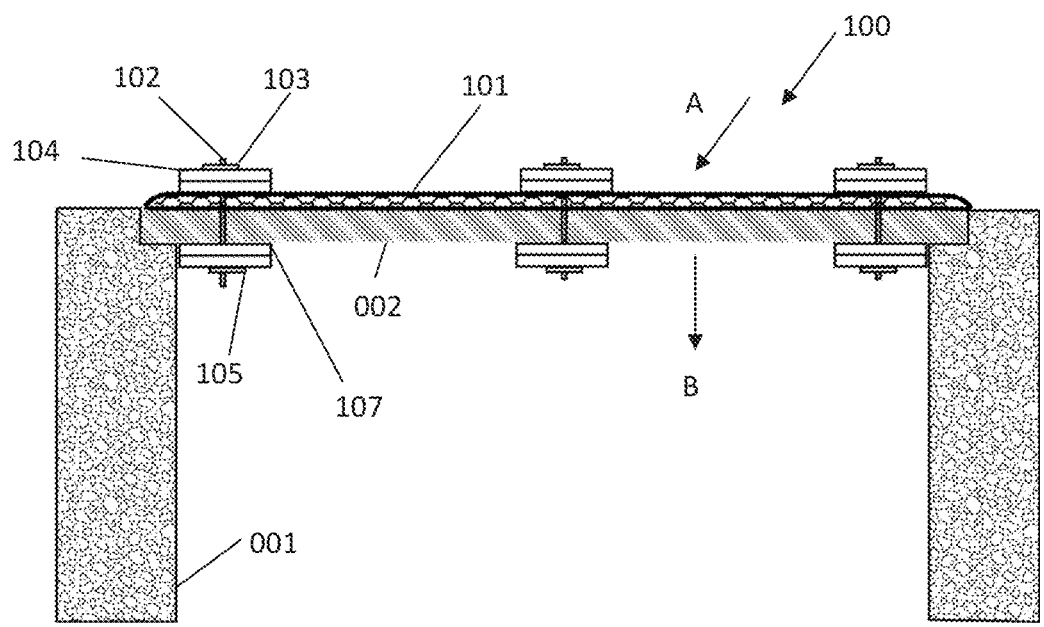
FIG. 1 depicts a cross-sectional view of an embodiment of a storm water grated entry with an over grate filter of the invention installed.
Figure 2:
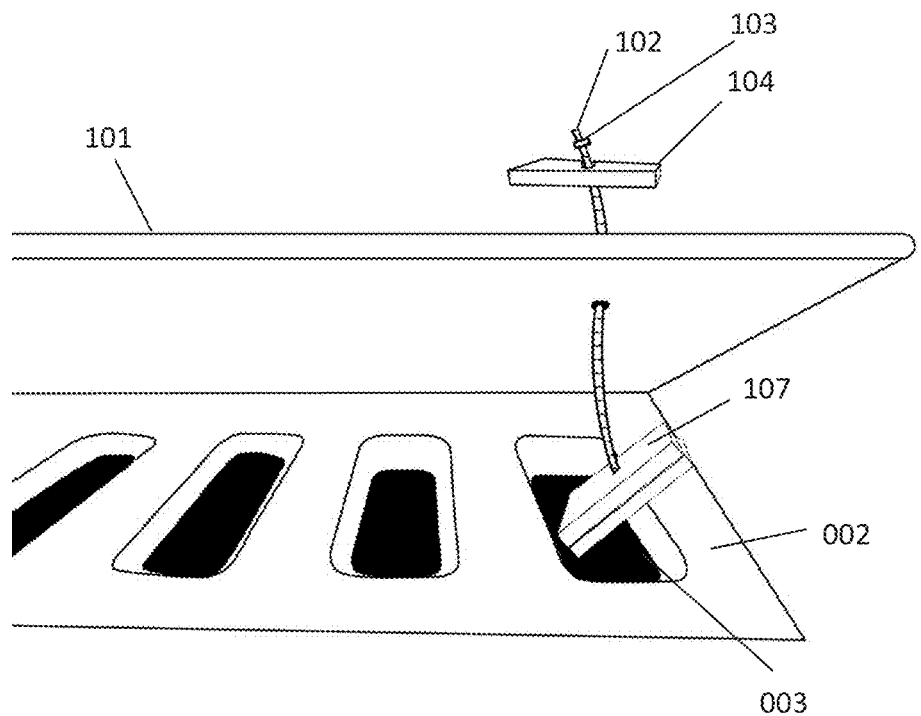
FIG. 2 depicts a partial perspective view of a storm water grated entry, showing the retaining hardware that holds the over grate filter to an upper surface of the grate.
Figure 3:
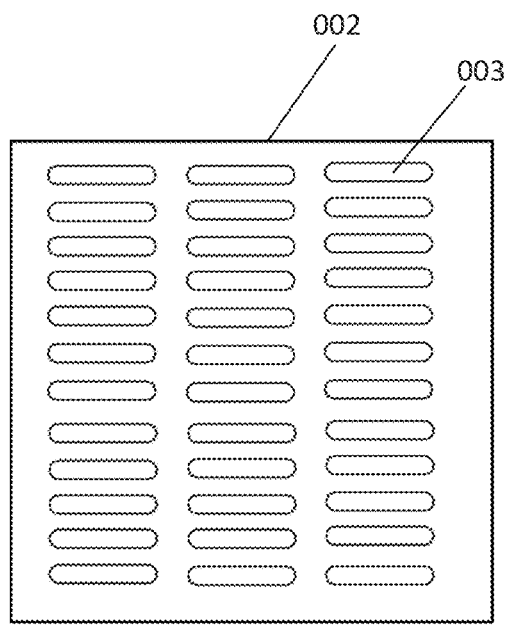
FIG. 3 is a top view of a typical storm water grate upon which the over grate filter of the invention is typically installed.

Referring now to FIGS. 1-5, an embodiment of the over grate filter of the invention is depicted in various views. Referring specifically to FIG. 1, a cross-sectional view of an over grate filter 100 of the invention installed on a great is depicted. Filter 101 is disposed on an upper surface of grate 002 and may be attached and held in place by a retaining assembly comprising lower retaining plate 107, upper retaining plate 104, fastener 102, fastener stop 105 and locking mechanism 103. Grate 002 may be a typical storm grate as is typically used to cover storm water entrances and the like but may be any similar structure for which it is desired to filter out debris, sediment, particulate matter, and other unwanted matter from a stream of water. Fastener 102 extends from below lower retaining plate 107, and passes up through the storm water grate 002, through a hole disposed in the filter 101, and through upper retaining plate 104, where it is retained by a locking mechanism 103. In this manner, filter 101 is attached to an upper surface of storm water grate 002. As depicted in the figure, there may be a plurality of lower retaining plates 107 in a retaining assembly, and likewise there may be a plurality of upper retaining plates 104 in a retaining assembly. A retaining assembly may comprise any number of upper and lower retaining plates 104 and 107, respectively. The invention may comprise one or more retaining assemblies for retaining filter 101 to an upper surface of grate 002. Storm water containing particulate matter, sediments, or other undesired materials may move towards the filter in the direction of arrow A. As storm or other runoff water enters filter 101, the undesired materials such as particular matter, sediments, debris, or other matter are substantially filtered out of the water by operation of filter 101, allowing filtered water to pass through the filter, continue through storm water grate 002, and into the storm water drainage system in the direction of arrow B. In this manner, storm water containing undesired particular matter and the like is filtered by the over grate filter system of the invention 100.

Still referring to FIGS. 1-5, fastener stop 105 operates to prevent fastener 102 from pulling through lower retaining plate 107. Lower retaining plate 107 prizes and opening for accepting fastener 102 and allowing it to pass there through. Fastener stop 105 may be for example in a mechanical device attached to a lower end of fastener 102 that prevents fastener 102 from pulling completely through the opening in lower retaining plate 107. Fastener 102 is any fastener known in the art. Fastener 102 may, in a preferred embodiment, be a heavy duty zip tie. A zip tie is typically fabricated of nylon or some other plastic material, and has a flexible tape section with teeth that engage with a pawl in the head to form a ratchet so that as the free end of the tape section is pulled the tie-wrap tightens. In the embodiments of the invention in which fastener 102 is a zip tie, fastener stop 105 may be the head of fastener 102, and locking mechanism 103 may be the head of another zip tie that has been trimmed, with the head installed on the upper end of fastener 102. This embodiment of the retaining assembly of the invention is depicted in FIGS. 9 through 19.

Still referring to FIGS. 1-5, filter 101 may comprise any type of fabric, and any combination of layers of fabric, in any number, as may be desired by a user to establish a particular filtration effect. Factors to be considered in the selection of permeable filter fabrics to be used, and the number of layers to be used to comprise filter 101, include the velocity of the expected storm water containing particulate matter and the anticipated level of sediment, debris, or other unwanted material to be filtered. Typically, filter 101 may be comprised of at least one layer of permeable filter fabric. Other types of fabric, including both woven and non-woven fabrics, in any number of layers or combinations of layers, may comprise filter 101. Furthermore, filter 101 may comprise a structural support member which may be, for example, a mesh material contained between the fabric layers of the filter. The mesh material may be fabricated from metal, plastic or any other material suitable for the anticipated application.

Figure 4:
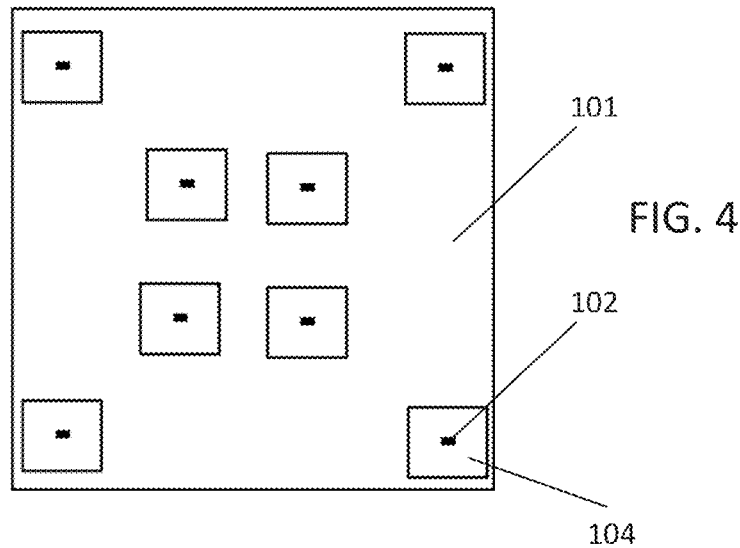
FIG. 4 is a top view showing a typical arrangement of retaining hardware holding the over grate filter to an upper surface of a storm water grate.
Figure 5:
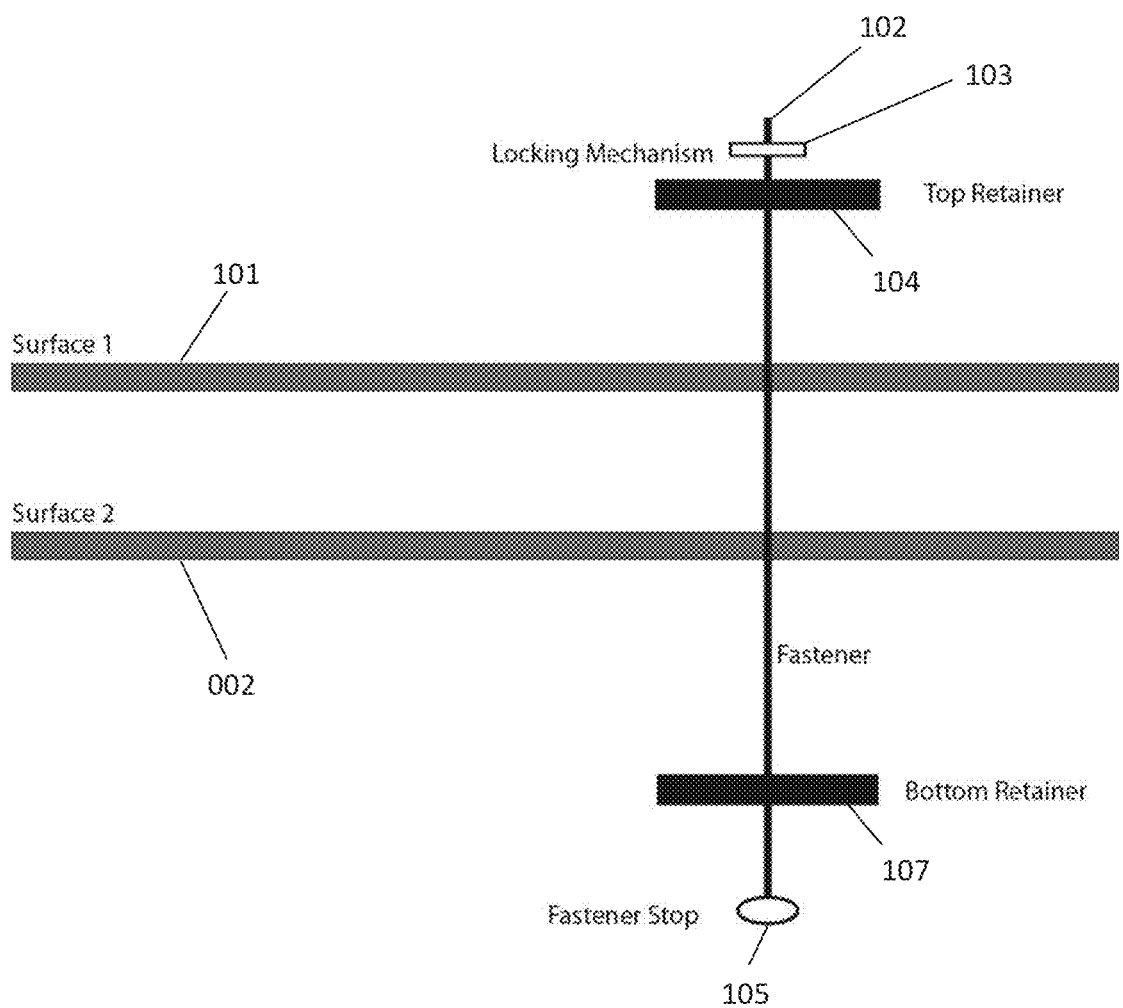
FIG. 5 is a schematic view of the retaining hardware for holding the over grate filter to an upper surface of the grate.
Figure 6:
FIG. 6 is a photograph of a lower retaining plate, or bottom retainer, of the invention.
Figure 7:
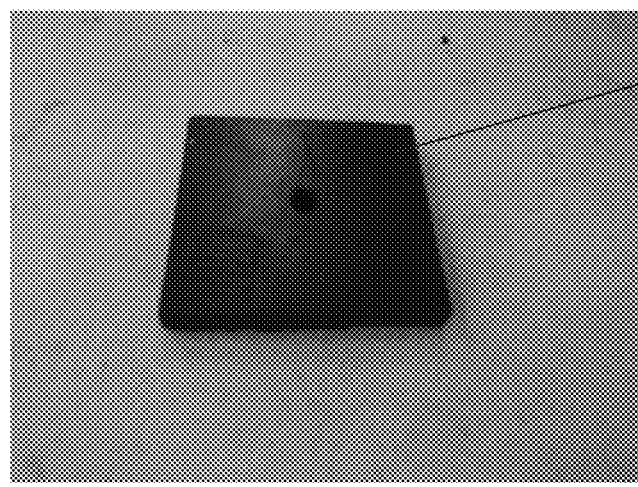
FIG. 7 is a photograph of an upper retaining plate, or top retainer, of the invention.

Still referring to FIGS. 1-5, a method for assembling an over grate filter of the invention 100 and assembling it onto an upper surface of a storm water grate may be described as follows. First, fastener 102 is inserted through at least one lower retaining plate 107 until it is prevented from pulling further through lower retaining plate 107 by operation of fastener stop 105. This step is repeated for each of the retaining assemblies to be utilized in the installation. Next, lower retaining plate 107 for each retaining assembly is canted at an angle and inserted through opening 003 in grate 002 at the desired locations where it is intended for retaining assemblies to be disposed. A typical pattern for location of retaining assemblies is depicted in FIG. 4 which, as an example only, depicts an installation comprising eight retaining plate assemblies. The retaining plate assemblies of the invention may be of any number and at any location is desired by user, based upon the anticipated volume and velocity of anticipated storm water runoff. Next, after lower retaining plates 107 are inserted through opening 003 in grate 002, fasteners 102 are motivated through openings in filter 101, and are continued to be motivated through at least one upper retaining plate 102 as depicted in FIG. 1 and FIG. 5. Finally, locking mechanisms 103 are installed on the upper end of fastener 102 for all retaining plate assemblies, and locking mechanisms 103 are snugged down onto an upper surface of upper retaining plate 104. The over grate filter of the invention 100 is then ready for use and will be retained in place by at least one, but preferably a plurality, of retaining plate assemblies as depicted in the figures.

Figure 8:
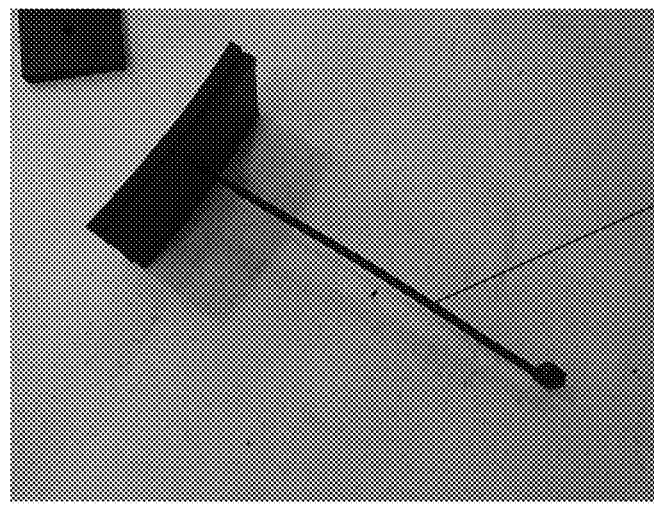
FIG. 8 is a photograph of a fastener of the invention being inserted into one of the retaining plates of the invention.
Figure 9:
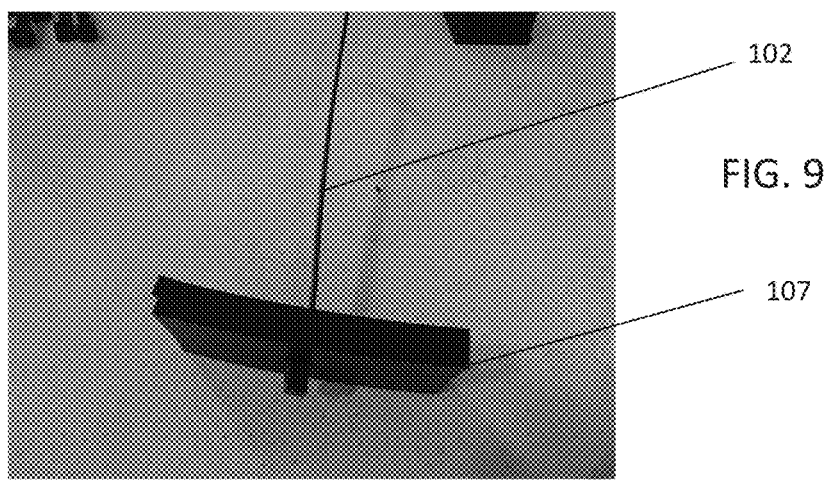
FIG. 9 is a photograph of a fastener of the invention inserted into one of the lower retaining plates of the invention.
Figure 10:
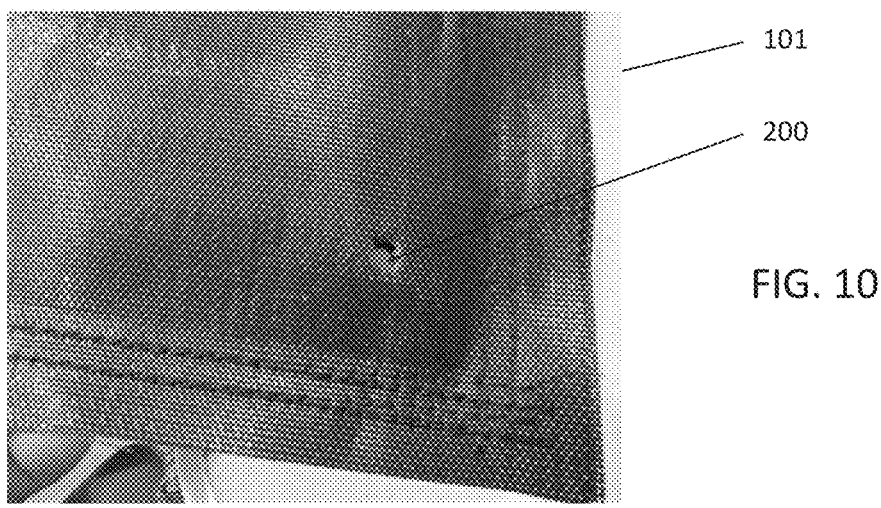
FIG. 10 is a photograph of a filter of the invention, showing a hole through which a fastener may pass in order to retain the filter to the retaining hardware.

Referring now to FIGS. 9-20, the assembly process hereinbefore described is depicted in photographs in a typical but not limiting installation. FIG. 8 is a photograph of a fastener of the invention being inserted into one of the retaining plates of the invention. FIG. 9 is a photograph of a fastener of the invention inserted into one of the lower retaining plates of the invention. FIG. 10 is a photograph of a filter of the invention, showing a hole through which a fastener may pass in order to retain the filter to the retaining hardware.

Figure 11:
FIG. 11 is a photograph of a filter of the invention, showing a hole through which a fastener may pass in order to retain the filter to the retaining hardware, and showing a fastener of the invention inserted into one of the lower retaining plates of the invention.
Figure 12:
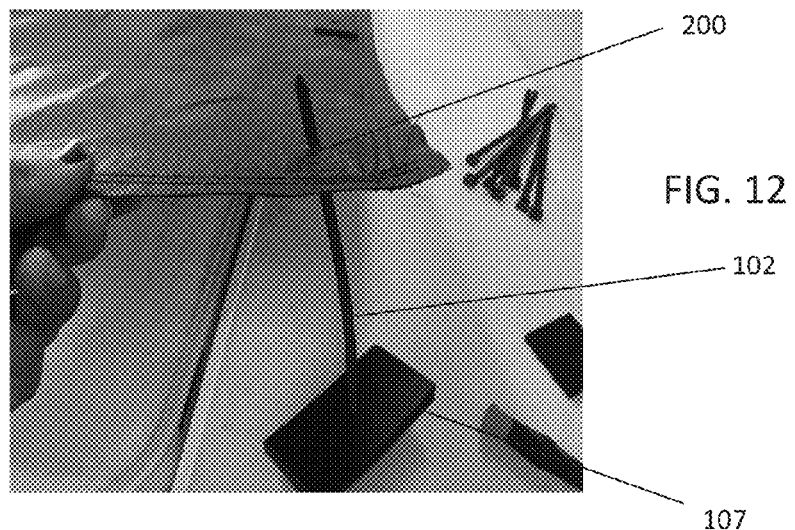
FIG. 12 is a photograph of a filter of the invention, showing a hole through which a fastener is being passed in order to retain the filter to the retaining hardware, and showing a fastener of the invention inserted into one of the lower retaining plates of the invention.
Figure 13:
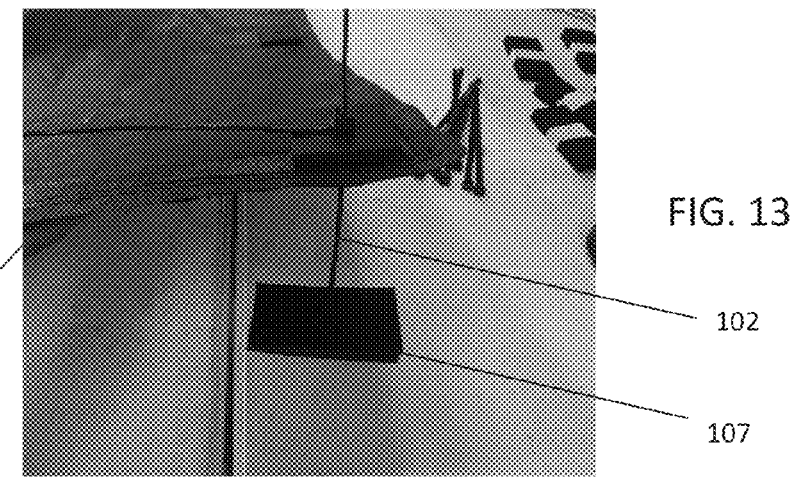
FIG. 13 is a photograph of a filter of the invention, showing a hole through which a fastener is being passed in order to retain the filter to the retaining hardware, and showing a fastener of the invention inserted into one of the lower retaining plates of the invention, and showing an upper retaining plate with the fastener protruding therethrough and an upper locking mechanism installed on the fastener.
Figure 14:
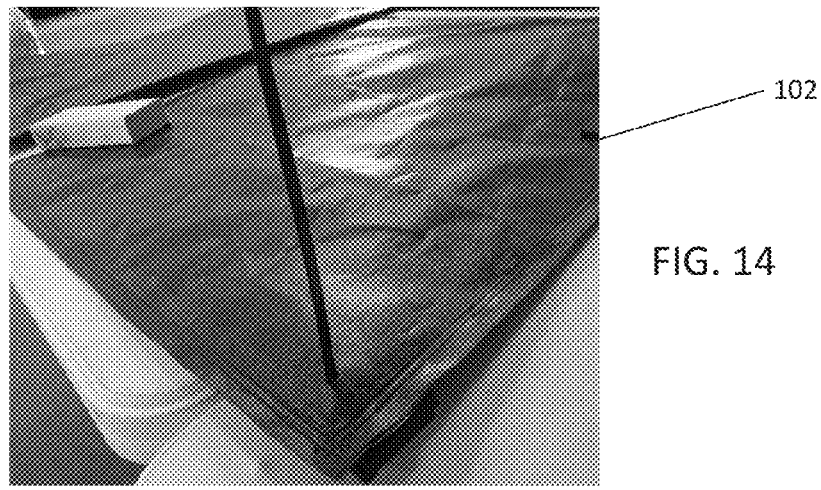
FIG. 14 is a photograph of a filter of the invention, showing the fastener of the invention protruding through the filter.
Figure 15:
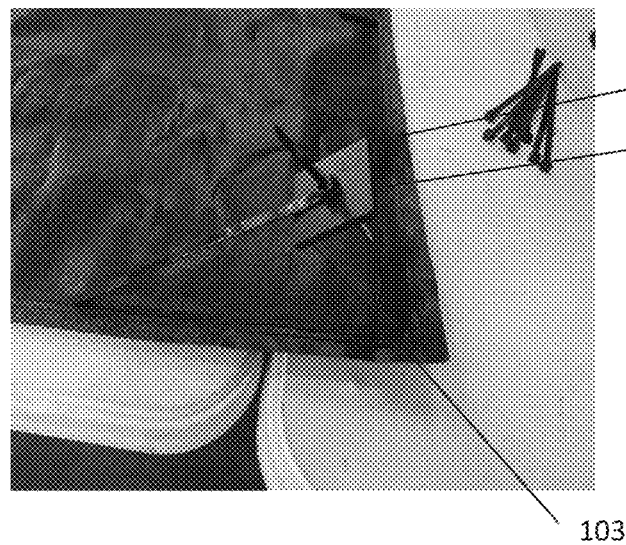
FIG. 15 is a photograph of a filter of the invention, showing a hole through which a fastener is being passed in order to retain the filter to the retaining hardware, and showing a fastener of the invention inserted into one of the lower retaining plates of the invention, and showing an upper retaining plate with the fastener protruding therethrough and an upper locking mechanism installed on the fastener.
Figure 16:
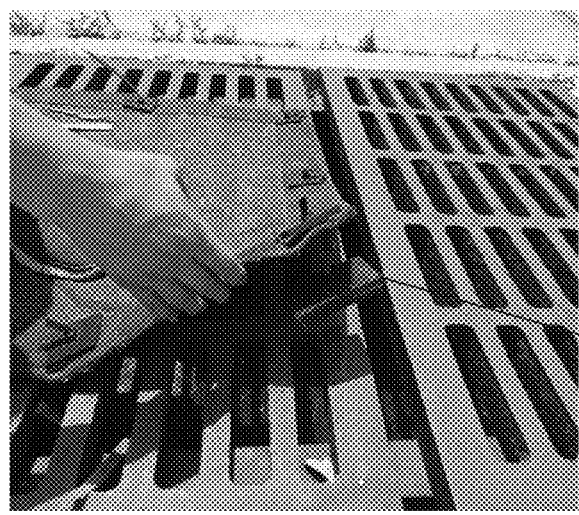
FIG. 16 is a photograph of a filter of the invention being installed on a storm water grate before the lower retaining plate is inserted into a grate.
Figure 17:
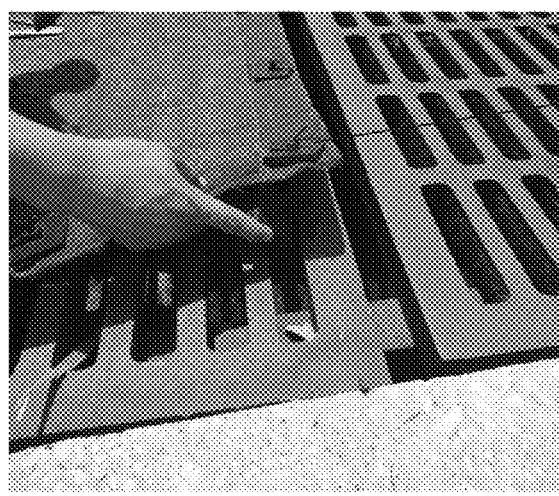
FIG. 17 is a photograph of a filter of the invention being installed on a storm water grate after the lower retaining plate is inserted into a grate.
Figure 18:
FIG. 18 is a photograph of a filter of the invention being installed on a storm water grate after the lower retaining plate is inserted into a grate.
Figure 19:
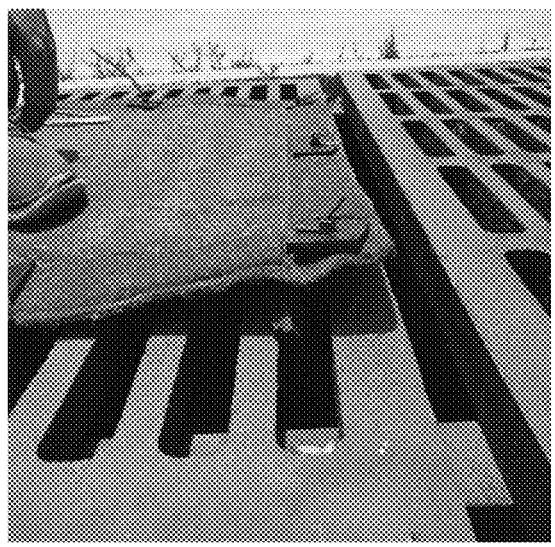
FIG. 19 is a photograph of a filter of the invention being installed on a storm water grate, after the lower retaining plate is inserted into a grate, and after the fastener and locking mechanism have been tightened and the locking mechanism has been trimmed.
Figure 20:
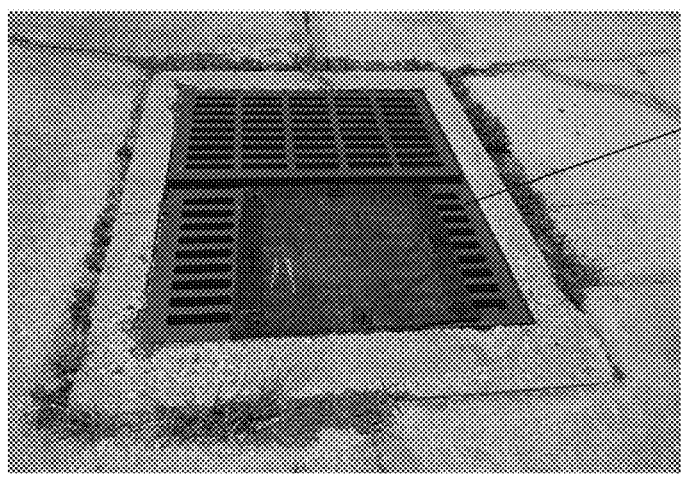
FIG. 20 is a photograph of a filter of the invention being installed on a storm water grate, showing a final, installed condition.

FIG. 11 is a photograph of a filter of the invention, showing a hole through which a fastener may pass in order to retain the filter to the retaining hardware, and showing a fastener of the invention inserted into one of the lower retaining plates of the invention. FIG. 12 is a photograph of a filter of the invention, showing a hole through which a fastener is being passed in order to retain the filter to the retaining hardware, and showing a fastener of the invention inserted into one of the lower retaining plates of the invention. FIG. 13 is a photograph of a filter of the invention, showing a hole through which a fastener is being passed in order to retain the filter to the retaining hardware, and showing a fastener of the invention inserted into one of the lower retaining plates of the invention, and showing an upper retaining plate with the fastener protruding therethrough and an upper locking mechanism installed on the fastener. FIG. 14 is a photograph of a filter of the invention, showing the fastener of the invention protruding through the filter. FIG. 15 is a photograph of a filter of the invention, showing a hole through which a fastener is being passed in order to retain the filter to the retaining hardware, and showing a fastener of the invention inserted into one of the lower retaining plates of the invention, and showing an upper retaining plate with the fastener protruding therethrough and an upper locking mechanism installed on the fastener. FIG. 16 is a photograph of a filter of the invention being installed on a storm water grate before the lower retaining plate is inserted into a grate. FIG. 17 is a photograph of a filter of the invention being installed on a storm water grate after the lower retaining plate is inserted into a grate. FIG. 18 is a photograph of a filter of the invention being installed on a storm water grate after the lower retaining plate is inserted into a grate. FIG. 19 is a photograph of a filter of the invention being installed on a storm water grate, after the lower retaining plate is inserted into a grate, and after the fastener and locking mechanism have been tightened and the locking mechanism has been trimmed.

FIGS. 21-29 depict data sheets describing various characteristics of permeable filter fabrics that may comprise filter 101 of the invention. The scope of the invention is not limited to the specific permeable filter fabrics depicted in the figures; rather, the physical characteristics of the filter fabrics depicted in the figures are exemplary parameters for filter fabrics that may comprise filter 101. Filter 101 may comprise fabric layers other than permeable filter fabrics as described in the figures. Furthermore, filter 101 may comprise any number of permeable filter fabric layers, or other layers of fabric, as may be desired by the user.

Although a detailed description as provided in the attachments contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus the scope of the invention should be determined by the appended claims and their legal equivalents, and not merely by the preferred examples or embodiments given.

What is claimed is:

1. An over grate filter, comprising:
   a filter; and
   at least one retaining plate assembly for retaining said filter onto an upper surface of a grade; structure wherein said retaining plate assembly further comprises at least one lower retaining plate, at least one upper retaining plate, and a fastener having an upper end and a lower end;
   a fastener stop disposed on said lower end of said fastener and in contact with a bottom side of said at least one lower retaining plate; and
   said fastener passing through said lower retaining plate, and passing through said filter, and passing through said upper retaining plate; and
   said fastener further comprising a locking mechanism on its upper end, said locking mechanism in contact with an upper surface of said upper retaining plate.

2. The over grate filter of claim 1, wherein said fastener is further defined as a zip tie having a head.

3. The over grate filter of claim 2, wherein said fastener stop is said head of said fastener.

4. The over grate filter of claim 3, wherein said locking mechanism is the head of a zip tie.

5. The over grate filter of claim 4, wherein said filter is further defined as being fabricated from at least one layer of permeable filter fabric.

6. The over grate filter of claim 3, wherein said filter is further defined as being fabricated from at least one layer of permeable filter fabric.

7. The over grate filter of claim 2, wherein said locking mechanism is the head of a zip tie.

8. The over grate filter of claim 7, wherein said filter is further defined as being fabricated from at least one layer of permeable filter fabric.

9. The over grate filter of claim 2, wherein said filter is further defined as being fabricated from at least one layer of permeable filter fabric.

10. The over grate filter of claim 1, wherein said filter is further defined as being fabricated from at least one layer of permeable filter fabric.

11. The over grate filter of claim 1, wherein said filter further comprises a media selected from the group consisting of flocculants, coagulants, extra activated charcoal filters, heavy metal filters and hydrocarbon filters.

12. A method for filtering storm water runoff, comprising:
   providing a filter;
   disposing said filter on an upper surface of a structure;
   providing at least one retaining plate assembly for retaining said filter onto said structure, wherein said retaining plate assembly further comprises at least one lower retaining plate, at least one upper retaining plate, and a fastener having an upper end and a lower end;
   providing a fastener stop disposed on said lower end of said fastener and in contact with a bottom side of said at least one lower retaining plate, said fastener passing through said lower retaining plate, and passing through an opening in said structure, and passing through said filter, and passing through said at least one upper retaining plate;
   providing a locking mechanism on said upper end of said fastener, said locking mechanism in contact with an upper surface of said at least one upper retaining plate;
   passing a fluid containing contaminants through said filter and said structure such that said contaminants are removed from said fluid; and
   wherein said structure is a storm water grate.

13. The method for filtering storm water runoff of claim 12, wherein said filter is comprised of at least one layer of permeable filter fabric.

14. The method for filtering storm water runoff of claim 13, wherein said filter further comprises a media selected from the group consisting of flocculants, coagulants, extra activated charcoal filters, heavy metal filters and hydrocarbon filters.

15. The method for filtering storm water runoff of claim 12, wherein said filter further comprises a media selected from the group consisting of flocculants, coagulants, extra activated charcoal filters, heavy metal filters and hydrocarbon filters.

\* \* \* \* \*